May 17, 1966 R. M. SCHWARTZ 3,251,638
TACKLE BOX
Filed Feb. 13, 1964
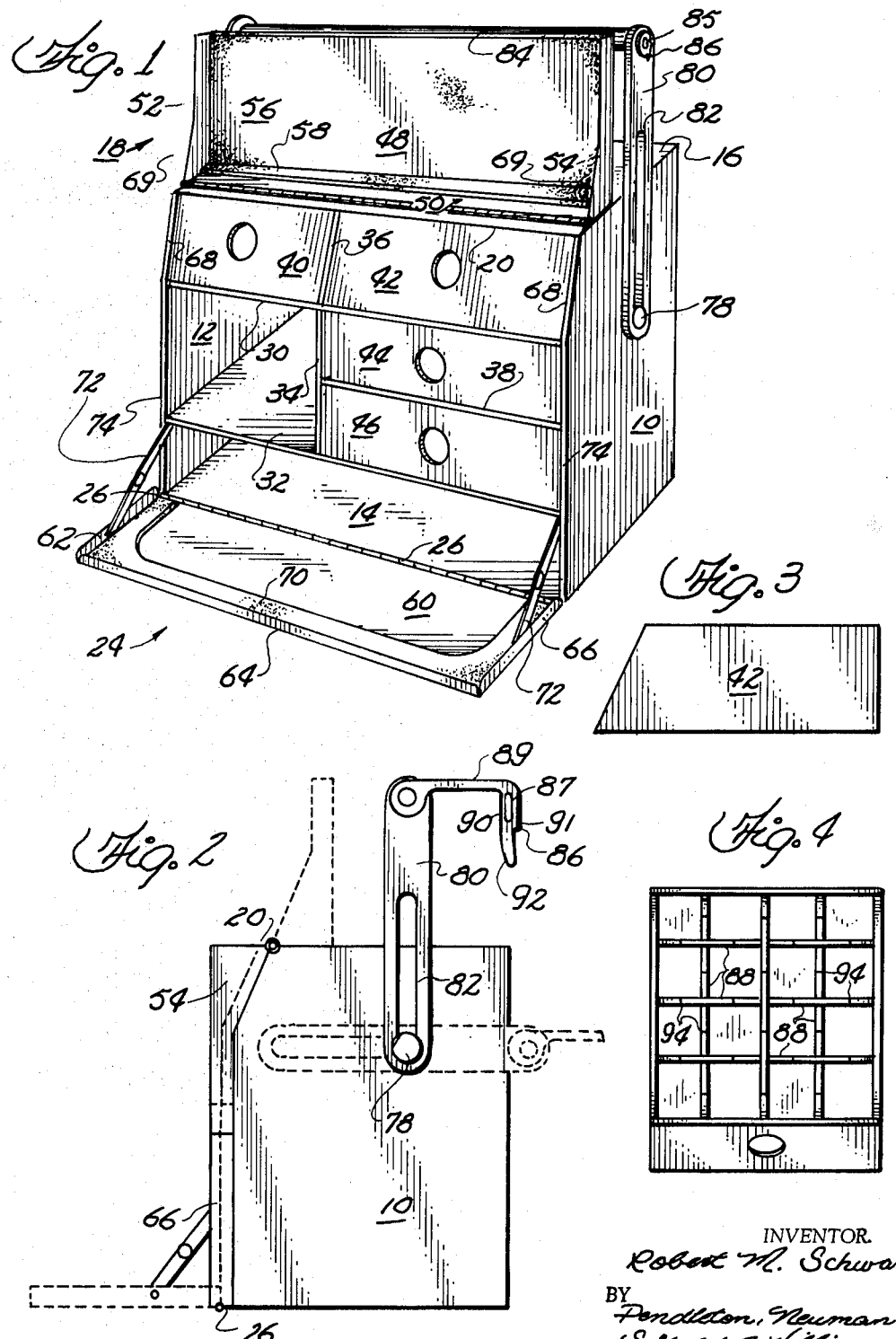
INVENTOR.
Robert M. Schwartz
BY Pendleton, Neuman,
Seibold & Williams
Attorneys

United States Patent Office 3,251,638
Patented May 17, 1966

3,251,638
TACKLE BOX
Robert M. Schwartz, 1534 Fargo, Chicago, Ill.
Filed Feb. 13, 1964, Ser. No. 344,717
8 Claims. (Cl. 312—244)

This invention relates to tackle boxes for use in storing, transporting and holding fishing tackle and the like, and more particularly to such boxes provided with means by which they are adapted to be supported from the side wall of a boat during use.

Several disadvantages have been common with prior tackle boxes, which rendered them at least partially unsatisfactory for the use for which they were intended. In particular, the construction of such boxes did not provide the universality of storage of various items of fishing tackle that is desirable, and sometimes did not allow ready access to various storage areas of the box.

Moreover, many prior tackle boxes require a horizontal surface upon which to place the box, which may not be available in a small fishing boat. Even if such a level surface can be found, the presence of the box on the floor of the boat takes up space which might be better used for another purpose, and sometimes tends to confine the movement of the fisherman using the box.

The present invention contemplates the construction of a tackle box including a plurality of storage compartments and working area, the latter being formed from portions of the cover of the box. One portion of the cover of the box forms a level tray when open, and another portion of the cover swings to a vertical position to expose storage compartments and equipment drawers, and also to provide a working area and shelf.

Accordingly, it is a principal object of the present invention to provide novel means for securing the box to the side of a boat in which the box is used.

Another object of the present invention is to provide a construction of a tackle box in which the various portions of the cover assembly are useful when the cover is open to facilitate the employment of the box during use.

Another object of the present invention is to provide a plurality of drawers for equipment storage and means for holding the drawers in their closed position automatically when the cover of the box is closed.

Another object of the present invention is to provide means for supporting the box, with provision for retracting the supporting means out of the way when not in use.

A further object of the present invention is to provide means for supporting the box on a side wall of the boat which is adapted to also function as a carrying handle for the box.

Another object of the present invention is to provide a storage grid particularly adapted for storing fishing lures.

A further object of the present invention is to provide a tackle box in which lures and other accessories cannot become entangled, even when the box is turned upside down.

A tackle box constructed in accordance with the present invention achieves the advantages of permitting easy access to any part of the box when in its opened condition, and at the same time is spillproof, both when carried and in use, light, and strong, and with a minimum of wasted space.

These and other objects and advantages of the present invention will be made manifest by an examination of this specification and the accompanying claims and drawings.

In accordance with one embodiment of the present invention there is provided a tackle box comprising a cabinet having a plurality of drawers and other storage compartments, cover means constructed in a plurality of sections adapted to cover said storage compartments and hold the drawers shut when the cover sections are in their closed position and adapted to serve as working areas when said sections are in their open position, and means adapted to removably secure the box to the side wall of a boat or the like, which securing means functions as a carrying handle for the box and is adapted to retract out of the way when not in use.

Reference will now be made to the drawings in which:
FIG. 1 is a perspective view of a box constructed in accordance with the present invention, with its cover in its open condition;
FIG. 2 is a side view of the box of FIG. 1, with its cover closed;
FIG. 3 is a side view of one of the drawers of the box of FIGS. 1 and 2; and
FIG. 4 is a plan view of the drawer of FIG. 3.

Referring now to the drawings, there is illustrated a tackle box having a pair of side walls 10 and 12 each connected to a bottom wall 14 and a top wall. A rear wall (not shown) is connected to the rear edges of the side walls 10 and 12 the bottom wall 14 and the top wall 16 to form the body of the box, which is open at the front and closed on the remaining five sides.

An upper cover section 18 is hingeably secured to the top wall 16 by a piano hinge 20, and a lower cover section 24 is hingeably connected to the bottom wall 14 by a piano hinge 26. A plurality of interior walls are disposed inside the body of the box, dividing the same into a plurality of storage compartments. In particular, an upper shelf 30 and a lower shelf 32 are connected between the side walls 10 and 12 of the box and extend horizontally thereacross to divide the interior of the body of the box into three spaces disposed in stacked relation with each other. A first vertical wall 34 is connected between the shelves 30 and 32 and a second vertical wall 36 is disposed between the shelf 30 and the top wall 16 in alignment with the first vertical wall 34. Each of the vertical walls 34 and 36 subdivide the spaces in which they are disposed into separate storage areas. An additional horizontal shelf 38 is connected between the vertical wall 34 and the side wall 10 to further subdivide the space in which it is disposed.

The several interior shelves and walls of the body of the box define compartments in which a plurality of drawers 40, 42, 44 and 46 are disposed in sliding relationship with the walls bounding such compartments. The remaining compartments are not provided with drawers but are instead left open, as illustrated, to provide storage space for larger accessories to be stored in the tackle box.

In the tackle box illustrated in the drawings, the bottom open storage area adjacent to the bottom wall 14 is preferably used for larger accessories while the other open storage area above the bottom area is adapted to store one or more fishing reels for easy accessibility to the user of the box. To the right of the reel compartment the storage drawers 44 and 46 are preferably provided with movable dividers to permit flexibility of arrangement, and may be used for storing smaller accessories.

Located above the reel compartment, the drawer 40 is adapted to contain utilities such as tools, spark plugs, shear pins, etc. To the right of the drawer 40 is disposed a storage grid 42, the construction of which will be more fully described hereinafter.

The upper cover section 18 is provided with a cover panel 48, a top panel 50 connected to the cover panel, and a pair of side walls 52 and 54 connected to opposite edges of the cover panel 48 and of the top panel 50. The piano hinge 20 is connected between the top panel 50 and the top wall 16, and permits the upper cover section 18 to be swung therearound until the top panel 50 resets on the top wall 16, which provides stable support for the top section 18 when the cover is opened. The tackle box is preferably constructed of sheet metal, and the piano hinge 20 is preferably formed by providing a plurality of spaced tabs at the edges of the top wall 16 and of the top panel 50, bent to form the knuckles of the hinge. When in the opened condition, the cover panel 48 is adapted to assume a substantially vertical attitude, and the top panel 50 is substantially horizontal which serves as a working surface during the use of the box. A cork panel 56 is secured to the interior surface of the cover panel 48, and serves to temporarily hold fish hooks, lures and the like. Another cork panel 58 overlies part of the upper panel 50.

The lower cover section 24 comprises a tray, which when opened has a substantially horizontal cover panel 60 forming the bottom thereof, and side walls 62, 64 and 66 connected to the edges of the cover panel 60 to form a lip around the periphery of the tray. The piano hinge 26 is preferably constructed with knuckles formed from the edges of the bottom wall 14 and the bottom cover section 24. A U-shaped cork insert 70 is secured to the interior surface of the cover panel 60, into which hooks may be temporarily inserted to hold them during the use of the tackle box. The cork insert 70 may also be used as a cutting surface.

A space is provided between the ends of the wall 64 and the adjacent ends of the side walls 62 and 66, to permit the side walls 62 and 66 of the lower cover section 24 to overlap the side walls 10 and 12 of the body when the lower cover section 24 is in its closed position. In closed position, the cork insert 70 bears against the edges of the walls 10 and 12 to provide a water-tight seal at this portion of the box.

A pair of hinged supports 72 are pivotally connected between the side walls 10 and 12 of the box and the side walls 62 and 66 of the lower cover section 24 to hold the latter substantially horizontally when open. The supports 72 fold into the box when the lower cover section 24 is closed.

The upper portions 68 of the front edges of each of the side walls 10 and 12 are formed to be cut back at an angle which is complementary to the shape of the edges 69 of the side walls 52 and 54 of the upper cover section 18. The side walls 10 and 12 of the body of the box extend slightly forward of the piano hinge 20, so that the side walls 52 and 54 of the upper cover section 18 overlap the side walls 10 and 12 of the body when the upper cover section 18 is closed. In addition, the cork panel 56 engages the vertical edges 74 of the side walls 10 and 12 below their upper portions 68, to form a water-tight seal along these edges. The angular shape of the edges 68 of the side walls 10 and 12 of the body, and the corresponding shape of the side walls 52 and 54 of the upper cover section 18, allows maximum space for the drawers 40 and 42, while permitting the shelf formed by the top panel 50 of the upper cover section 18 to be wide enough to be useful as a working area, and at the same time facilitating access to the shelf 50 and preserving the relatively smooth and attractive lines of the box itself. It will be apparent that, since the cover, in closed condition, is juxtaposed with the ends of the storage grid 42, various drawers 40, 44 and 46, and with the open sides of the various open storage spaces, the contents of these storage compartments are held in position as long as the cover sections are closed. They become instantly accessible, however, as soon as the cover is open. A latch mechanism (not shown) is preferably provided to latch the cover sections 18 and 24 together in closed relation when desired.

In each of the side walls 10 and 12 is disposed a stud 78, having an offset or flattened terminal portion. A link 80 is provided on each side of the box, adjacent to the side walls 10 and 12. Each link 80 has a slot 82 with which a stud 78 is engaged, so that the link 80 is supported in slidable and rotatable relation with its stud 78 (see FIG. 2). Between the upper ends of the two links 80 is connected a crosspiece 84 which serves as a handle for conveniently carrying the box.

When the links 80 and the carrying handle 84 are not being used, the slidable connection between each stud 78 and slot 82 permit the entire handle assembly to be lowered until the crosspiece 84 rests on the top wall 16. In this position, it does not interfere with the use of the box.

A pair of L-shaped hooks 86 are pivotally connected to the outside of the upper end of the links 80 by a pair of studs 85, to permit the hooks 86 to be freely rotated with respect to the links 80. The hooks 86 each comprise a pivoted leg 89 and a terminal leg 91.

The hooks 86 are adapted to hold the box in fixed relation to the side of a boat by placing the terminal legs of the hooks 86 over the upper edge of the side wall of the boat. It will be apparent that when the box is thus supported, the hooks 86 may rotate with respect to the crosspiece 84 and the links 82 may rotate with respect to the studs 78 such that the rear wall of the tackle box rests against the side wall of the boat. The terminal leg 91 of each of the hooks 86 is provided with a slot 87, which slots are adapted to accommodate a carrying strap (not shown) to permit the box to be carried by that means.

The boat-gripping edge of each terminal leg 91 has a first portion 90 which extends substantially perpendicular to the pivoted leg 89, and a second portion 92 bent outwardly as seen in FIG. 2. It has been found that this hook construction may be used effectively with various boats which have differing side wall constructions.

Referring now to FIGS. 3 and 4, there is shown respectively side and plan views of the lure storage grid 42. The grid 42 is provided with a plurality of fixed dividers 88, by which the grid is subdivided into a plurality of equal compartments of such size and shape as to effectively accommodate one lure each. It has been found that a compartment size of approximately 1½" square and 4" high is eminently satisfactory for the storage of individual lures. When the lures are thus stored in the grid 42, each of them is instantly accessible to the user of the box, and the lures themselves do not become entangled with each other. The dividers 88 are provided with a plurality of notches or slots 94, each being adapted to receive a hook of a lure. The upper edges of the dividers 88 are closely spaced from the interior surface of the top wall 16 of the body of the box, to prevent the hook from being disengaged from its respective slot 94, even though the box may be turned upside down. The grid 42 has no bottom, so that if a lure is inadvertently dropped into its compartment without being hooked into a notch 94, it may be easily retrieved merely by sliding out the grid and letting the lure drop onto the tray 60.

From the foregoing, the present invention has been sufficiently described to enable others skilled in the art, by applying current knowledge, to adapt the same for varying conditions of use without departing from the essential items of novelty involved, which are intended to be defined and secured by the appended claims.

What is claimed is:

1. A tackle box comprising a body portion having closed top, bottom, rear and side walls, said body having a plurality of fixed first dividers extending between various ones of said walls to subdivide said box into a plurality of individual storage areas, one of said storage areas having a bottomless grid disposed in sliding relation with said dividers for horizontal sliding movement between closed and open relation with said box, said grid having a plurality of fixed second dividers subdividing the same into a plurality of vertically extending compartments, each adapted to contain an individual fishing lure, hanging from the upper edge of one of said fixed second dividers.

2. Apparatus according to claim 1, wherein some of said second dividers are provided with notches adjacent said compartments, whereby individual fishing lures may be secured to said dividers by placing the hooks of said lures in said notches.

3. Apparatus according to claim 2, wherein said top wall is disposed adjacent the top of said grid, whereby said lures are prevented from being disengaged from said notches.

4. A tackle box comprising a body portion having closed top, bottom, rear and side walls, each of the side walls of said body having a stud therein, a pair of links each having a linkage slot therein, each of said links supported for rotation and for longitudinal sliding movement by one of said studs by engagement with said slot, said links each being free to rotate about its respective stud when said links have been moved longitudinally such that said crosspiece is at its maximum distance from said studs, and a crosspiece interconnecting end portions of said links.

5. Apparatus according to claim 4, including a pair of hook members rotatably supported by said links, said hook members being adapted to be hooked over the top of a side of a boat, with said rear wall aligned substantially vertically against said side.

6. Apparatus according to claim 4, wherein the length of said slots is sufficiently long to enable said crosspiece to rest on said top wall.

7. A tackle box comprising a body portion having closed top, bottom, rear and side walls, said body having a plurality of fixed dividers extending between various ones of said walls to subdivide said box into a plurality of individual storage areas, one of said storage areas having a grid disposed in sliding relation with said dividers, said grid having a plurality of fixed dividers subdividing the same into a plurality of compartments, each adapted to contain an individual fishing lure, a cover assembly adapted to be moved from an open condition to a substantially flush closed condition to close said storage areas, said cover assembly when in open condition comprising a tray disposed at the lower portion of said body and a shelf disposed at the upper portion of said body, said tray having a rim surrounding the periphery thereof, means secured to said body to selectively hold said tray substantially horizontally, said shelf being adapted to selectively rest on said top wall and be supported substantially horizontally thereby, said shelf having a panel extending substantially normal thereto and secured to the rear edge thereof, a pair of side walls interconnected with said shelf and said panel at the edges thereof and adapted to overlap portions of said side walls of said body, each of the side walls of said body having a stud therein, a pair of links, each supported by one of said studs by engagement with a slot in said link, a crosspiece interconnecting end portions of said links, and a pair of hook members rotatably supported by said links.

8. A tackle box comprising a body portion having closed top, bottom, rear and side walls, said body having a plurality of fixed dividers extending between various ones of said walls to subdivide said box into a plurality of individual storage areas, one of said storage areas having a grid disposed in sliding relation with said dividers, said grid having a plurality of fixed dividers subdividing the same into a plurality of compartments, each adapted to contain an individual fishing lure, a cover assembly adapted to be moved from an open condition to a substantially flush closed condition to close said storage areas, said cover assembly when in open condition comprising a tray disposed at the lower portion of said body and a shelf disposed at the upper portion of said body, said tray having a rim surrounding the periphery thereof, means secured to said body to selectively hold said tray substantially horizontally, said shelf being adapted to selectively rest on said top wall and be supported substantially horizontally thereby, said shelf having a panel extending substantially normal thereto and secured to the rear edge thereof, each of the side walls of said body having a stud therein, a pair of links, each supported by one of said studs by engagement with a slot in said link, a crosspiece interconnecting end portions of said links, and a pair of hook members rotatably supported by said links.

References Cited by the Examiner

UNITED STATES PATENTS

| | | | |
|---|---|---|---|
| 498,455 | 5/1893 | Bartlett | 312—200 XR |
| 507,939 | 10/1893 | Simpson. | |
| 1,113,832 | 10/1914 | Roth | 206—16 |
| 1,492,453 | 4/1924 | Haines | 220—94 X |
| 1,524,688 | 2/1925 | Chilingirian | 312—199 |
| 1,655,560 | 1/1928 | Pinten | 206—45 |
| 2,558,955 | 7/1951 | Hilton | 312—244 X |
| 2,629,644 | 2/1953 | Heys | 312—324 X |
| 2,711,050 | 6/1955 | McIntyre | 43—57.5 |
| 2,846,806 | 8/1958 | Gaines | 43—54.5 |
| 2,999,583 | 9/1961 | Mancini | 312—209 X |
| 3,050,356 | 8/1962 | Messmer | 312—244 X |

CLAUDE A. LE ROY, *Primary Examiner.*

CHANCELLOR E. HARRIS, FRANK B. SHERRY,
*Examiners.*